Aug. 7, 1962    L. A. DINE ETAL    3,048,079
COMBINATION LIGHT AND LENS MOUNT FOR CAMERAS
Filed Oct. 30, 1957
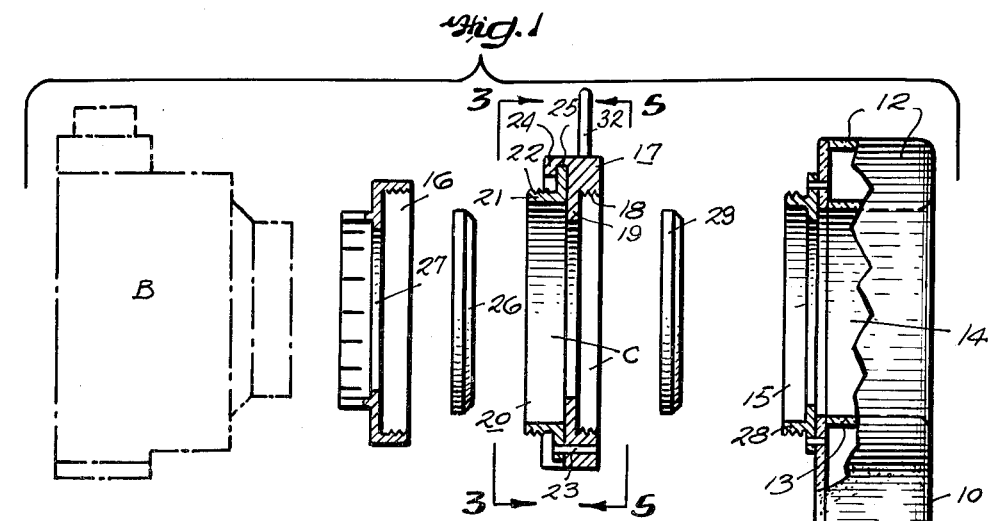
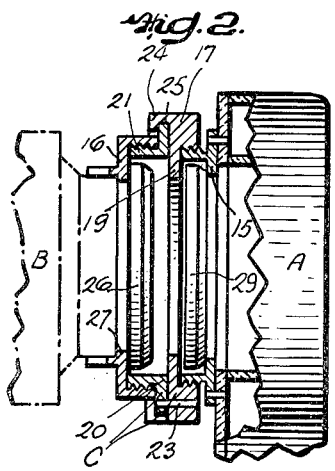
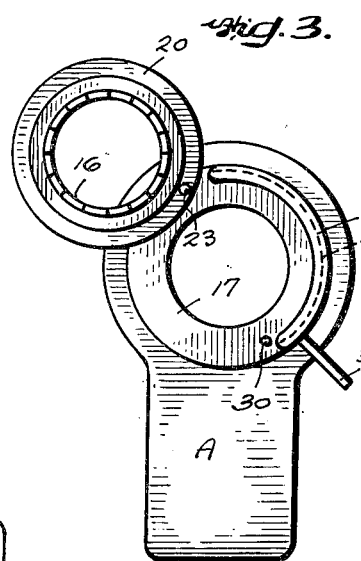
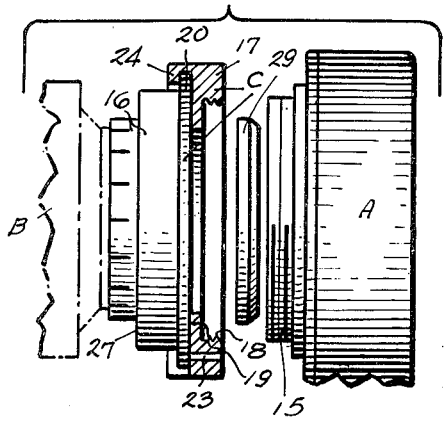
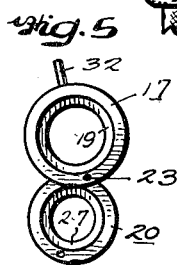
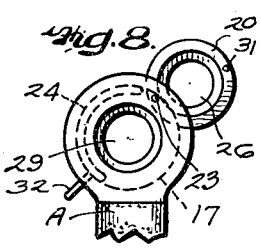
INVENTOR.
LESTER A. DINE
BY EDGAR S. LEMMEY
*Leev Edelson*
ATTORNEY

United States Patent Office 3,048,079
Patented Aug. 7, 1962

3,048,079
COMBINATION LIGHT AND LENS MOUNT
FOR CAMERAS
Lester A. Dine, 88 State Lane, and Edgar S. Lemmey,
17 Hollow Lane, both of Levittown, N.Y.
Filed Oct. 30, 1957, Ser. No. 693,449
5 Claims. (Cl. 88—1)

This invention relates generally to photographic cameras and more particularly to improvements in mountings for auxiliary camera lenses.

A principal object of the present invention is to provide an improved quick change auxiliary camera lens mounting device.

Another principal object of the present invention is to provide such a device with parts quickly shiftable relative to one another and operable both for locking an auxiliary camera lens in working position and for releasing the same.

Still another principal object of the present invention is to provide such a device adapted for use with a photographic light unit mountable directly upon the camera, and for changing of the auxiliary lens without any necessity for demounting the photographic light unit.

Other objects and advantages of the present invention will be apparent more fully hereinafter, it being understood that the invention consists in the general combination, construction, location and relative arrangement of parts, all as described in detail in the following specification, as shown in the accompanying drawings and as finally pointed out in the appended claims.

In the accompanying drawings:

FIGURE 1 is an exploded view of exemplary apparatus constructed in accordance with and embodying the principles of the present invention.

FIGURE 2 is a longitudinal section through the apparatus of FIGURE 1, shown assembled.

FIGURE 3 is a view taken as indicated by line 3—3 of FIGURE 1, showing the auxiliary lens quick change device open.

FIGURE 4 is a partially exploded view showing the auxiliary lens quick change device in longitudinal section and the camera and photographic light unit in side elevation.

FIGURE 5 is a view taken as indicated by line 5—5 of FIGURE 1, showing the auxiliary lens quick change device open.

FIGURES 6 and 7 are views of the auxiliary lenses shown in FIGURES 1 and 2.

FIGURE 8 is a front view of the quick change device and photographic light unit showing the former opened to facilitate changing the auxiliary lens.

Referring now to the drawing, the exemplary apparatus constructed in accordance with an embodying the principles of the present invention comprises a photographic light unit A including a housing that is formed of any suitable transparent material such as glass or clear plastic, and which is provided with a front wall 10 and a back wall 11 that are interconnected by outer and inner peripherally extending walls respectively designated 12 and 13. The inner peripherally extending wall 13 defines a light transmitting opening 14 that extends through the housing, and carried by the back wall 11 is an annulus 15 that is mounted in concentric relation to the opening 14, and which is adapted for having threaded thereon a suitable adapter ring 16 for mounting the unit upon the lens mount of a camera B. The photographic light unit A is identical in every respect to that disclosed in our United States Letters Patent, No. 2,682,603, issued June 29, 1954, and if it is found to be necessary or desirable, reference may be had to the aforesaid disclosure for a more detailed description of the photographic light unit per se.

The auxiliary camera lens quick change device C of the present invention comprises a front part in the form of a generally flat annulus 17 that is internally threaded, as at 18, and which has formed upon one face thereof a radially inwardly extending flange 19. The device C also comprises a back part in the form of a generally flat annulus 20 that has formed on the inner periphery thereof an axially extending flange 21, which is externally threaded, as at 22.

The front part 17 and the back part 20 of the device are disposed in mutually overlying concentric relation and are pivotally connected, as at 23, for planar swinging movement relative to one another. The flanged side of the front part 17 is disposed proximate the back part 20 and is provided with a peripherally extending arcuately shaped rib 24 that is grooved on the inner side thereof, as at 25, to snugly receive a peripherally extending marginal portion of the back part 20. The rib 24 is of such an arcuate extent and so disposed that the front part 17 and the back part 20 of the device may be swung about the pivot 23 approximately 180 degrees relative to one another.

In the fully assembled condition of the apparatus, the quick change device C is interposed between the annulus 15 that is secured to the back wall 11 of the photographic light unit A and the adapter ring 16 that is fitted over the lens mount of the camera B, as most clearly shown in FIGURE 2. The axially extending flange 21 of the quick change device part 20 extends freely about an auxiliary lens 26 that is of an external diameter intermediate the internal diameter of the flange aforesaid on the one hand and both the internal diameter of the flange 19 of the quick change device part 17 and the internal diameter of the radially extending wall of the adapter ring, designated 27, on the other hand. The axially extending flange of the annulus 15, designated 28, extends freely about a second auxiliary lens 29 that is of an external diameter intermediate the internal diameter of the flange aforesaid on the one hand and both the internal diameter of the flange 19 of the quick change device part 17 and the internal diameter of the radially extending wall of the annulus 15 on the other hand.

In order to assemble the apparatus of the present invention, the auxiliary lens 29 is slipped into the annulus 15, then the quick change device C is fitted to the photographic light unit A threading the front part 17 thereof onto the annulus 15. Now the adapter ring 16 is threaded onto the quick change device part 20, and the entire assembly is fitted to the camera lens mount by slipping the adapter ring 16 thereover.

The auxiliary lens 26 is mounted by first swinging the photographic light unit A and the front part 17 together about the pivot 23 of the quick change device C to thereby open the device C, as best shown in FIGURE 8. Then the auxiliary lens 26 is slipped into position, after which the photographic light unit A and the front part 17 are swung back again to their initial positions. To replace the auxiliary lens 26 with another lens, or to remove the same altogether, it is merely necessary to swing the photographic light unit A and the front part 17 together about the pivot 23, make the desired change, and then swing the photographic light unit A and the device part 17 back again to closed position. There is no need for demounting the photographic light unit A or the quick change device C or any of the parts thereof.

It will be observed that while it is necessary to unscrew the quick change device C from the annulus 15 when it is desired to change or remove the auxiliary lens 29, it is not necessary to unscrew the quick change device C from the adapter 16 when it is desired to change or remove the lens 26. Only two quick, simple motions are necessary—one motion to swing the front part 17 of the quick change device about the pivot 23 approximately 180 degrees to disengage the same from the rib 24, shift the same out of registry with the back part 20 and expose the auxiliary lens 26, and, after the lens has been changed or removed, a second motion to swing the front part 17 back again into registry with the back part 20 and into reengagement with the rib 24. It will be noted that the latter serves as a stop for automatically aligning the device part 20 when the device is closed, and for automatically limiting the swinging movement of the parts aforesaid relative to one another when the device is opened. In this connection, if desired, a protuberance 30 may be provided on one face of the quick change device part 17, as best shown in FIGURE 3, and an indentation 31 upon one face of the quick change device part 20, as best shown in FIGURE 8, for coaction with one another to index the device parts 17 and 20 and effect a snug fit of the marginal portion of the device part 20 in the groove 25 of the rib 24. In addition, to facilitate operation of the quick change device, a handle 32 may be provided, which handle may be threaded into the outer periphery of the device part 17.

It will be apparent, of course, that the use of auxiliary lenses 26 and 29 or either of them is entirely optional with the operator. Furthermore, the quick change device C may be used without the photographic light unit A and the auxiliary lens 29.

It will be understood that the auxiliary camera lens mounting device of the present invention is susceptible of various changes and modifications which may be made from time to time without departing from the real spirit or general principles of the invention. and it is accordingly intended to claim the same broadly as well as specifically as indicated by the appended claims.

What is claimed as new and useful is:

1. A quick-change auxiliary lens mount for fast detachable securement to cameras comprising, an adapter detachably securable to the lens mount of a camera, and a two-part auxiliary lens holder detachably securable to said adapter for forming an auxiliary lens holding chamber therewith and including a pair of coaxial end-abutting sleeves pivotally secured adjacent their peripheries to provide relative swinging motion therebetween in the plane of end-abutment, a first one of said sleeves being flanged outwardly at its abutting end, the second of said sleeves having an apertured wall at its abutting end cross-axially oriented relative to the sleeve axis and having a peripherally extending grooved rib adapted to receive the flange of said first sleeve when said sleeves are pivoted into coaxial end-abutting relation, and means associated with said adapter and one of said pair of coaxial sleeves for detachably securing the same together so that the axis of said secured sleeve becomes substantially coaxial with the focal axis of the lens of a camera to which said adapter may be secured and so that the said apertured wall of said second sleeve is disposed forwardly of and spaced apart from the adapter to thereby form an auxiliary lens holding chamber therebetween, said chamber being openable for inserting or withdrawing an auxiliary lens by pivoting said sleeves out of coaxial end-abutting relation and said chamber being closable for retaining a lens therewithin by pivoting said sleeves back into coaxial end-abutting relation.

2. The auxiliary lens mount according to claim 1 wherein said one of said pair of coaxial sleeves detachably securable to said adapter is said first sleeve.

3. The auxiliary lens mount according to claim 2 further including means associated with the second of said sleeves for detachably mounting a photographic light unit thereto.

4. A quick-change auxiliary lens mount for fast detachable securement to cameras comprising, an adapter detachably securable to the lens mount of a camera and a two-part auxiliary lens holder detachably securable to said adapter, said adapter including an apertured wall cross-axially oriented relative to the focal axis of the lens of the camera with said focal axis passing through the wall aperture when said adapter is secured to the camera lens mount, and a pair of sleeves coaxial with said wall aperture extending in opposite directions from said wall, one of said pair of sleeves being adapted to slip over the camera lens mount and thereby secure said adapter thereto, and the other of said pair of sleeves being threaded for securement to one part of said two-part auxiliary lens holder, said two-part auxiliary lens holder including a pair of coaxial end-abutting sleeves pivotally secured adjacent the peripheries of said sleeves to provide relative swinging motion between said sleeves in the plane of end-abutment, one of said sleeves being flanged outwardly at its abutting end, the other of said sleeves having a cross-axially oriented apertured wall at its abutting end and a peripherally extending grooved rib adapted to receive the flange of said one sleeve when said sleeves are pivoted into coaxial end-abutting relation, said one sleeve being threaded for coaxial alignment with and securement to the threaded one of said pair of coaxial adapter sleeves, whereby when the threaded sleeves of said adapter and said auxiliary lens holder are engaged an auxiliary lens chamber is formed between the cross-axially oriented apertured walls of said adapter and auxiliary lens holder.

5. The auxiliary lens mount according to claim 4 wherein said adapter sleeves, said two-part auxiliary lens holder sleeves, and the apertures in said adapter apertured wall and in said auxiliary lens holder apertured wall are all circular in cross section.

References Cited in the file of this patent

UNITED STATES PATENTS

| | | |
|---|---|---|
| 735,500 | Hamm | Aug. 4, 1903 |
| 1,282,293 | Roebuck | Oct. 22, 1918 |
| 1,966,149 | Stevens | July 10, 1934 |
| 2,009,145 | Nathan | July 23, 1935 |
| 2,431,172 | Harrison | Nov. 18, 1947 |
| 2,604,819 | Neller | July 29, 1952 |
| 2,682,603 | Dine | June 29, 1954 |
| 2,707,418 | Magnuson | May 3, 1955 |